United States Patent
Zhang et al.

(10) Patent No.: US 11,118,773 B2
(45) Date of Patent: Sep. 14, 2021

(54) CONVERSION CIRCUIT BETWEEN FLUORESCENT BALLAST AND LED

(71) Applicant: SIGNIFY HOLDING B.V., Eindhoven (NL)

(72) Inventors: Xianhui Zhang, Shanghai (CN); Frits Tobi De Jongh, Beek En Donk (NL); Han Lu, Eindhoven (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 107 days.

(21) Appl. No.: 16/462,335

(22) PCT Filed: Nov. 23, 2017

(86) PCT No.: PCT/EP2017/080142
§ 371 (c)(1),
(2) Date: May 20, 2019

(87) PCT Pub. No.: WO2018/099791
PCT Pub. Date: Jun. 7, 2018

(65) Prior Publication Data
US 2019/0368710 A1  Dec. 5, 2019

(30) Foreign Application Priority Data

Nov. 29, 2016 (WO) ............... PCT/CN2016/107723
Mar. 6, 2017 (EP) ..................... 17159383

(51) Int. Cl.
*H05B 33/08* (2020.01)
*F21V 23/06* (2006.01)
*F21V 29/70* (2015.01)
*F21K 9/278* (2016.01)
*H05B 45/3578* (2020.01)
*H05B 45/39* (2020.01)
(Continued)

(52) U.S. Cl.
CPC .............. *F21V 23/06* (2013.01); *F21K 9/278* (2016.08); *F21V 29/70* (2015.01); *H05B 45/3578* (2020.01); *H05B 45/39* (2020.01); *H05B 45/50* (2020.01); *F21Y 2103/10* (2016.08); *F21Y 2115/10* (2016.08)

(58) Field of Classification Search
CPC ......... H05B 45/37; H05B 45/00; F21V 29/70; F21V 23/009; F21K 9/278
See application file for complete search history.

(56) References Cited

U.S. PATENT DOCUMENTS 7,254,032 B1  8/2007  Xue et al.
8,668,361 B2  3/2014  Hasnain et al.
(Continued)

FOREIGN PATENT DOCUMENTS

CN    1209801 A      3/1999
CN  202125741 U      1/2012
(Continued)

*Primary Examiner* — Andrew J Coughlin
(74) *Attorney, Agent, or Firm* — Daniel J. Piotrowski

(57) ABSTRACT

A tubular LED lamp designed for connection to a high frequency ballast. An electrically conductive screen is provided with an electrical connection between an internal node, such as an internal LED ground, and the screen. This provides a low impedance path5 for leakage currents which bypasses the LED string and thus prevents glow.

14 Claims, 2 Drawing Sheets

(51) Int. Cl.
*H05B 45/50* (2020.01)
*F21Y 103/10* (2016.01)
*F21Y 115/10* (2016.01)

(56) References Cited

U.S. PATENT DOCUMENTS

| | | | |
|---|---|---|---|
| 10,356,864 B2* | 7/2019 | Chen | H05B 45/31 |
| 10,487,995 B2* | 11/2019 | Qiu | H05B 45/395 |
| 2009/0085490 A1 | 4/2009 | Awalt et al. | |
| 2015/0061542 A1 | 3/2015 | Hsia et al. | |
| 2015/0305112 A1* | 10/2015 | Klien | H05B 45/50 |
| | | | 315/85 |
| 2016/0174307 A1 | 6/2016 | Tao et al. | |

FOREIGN PATENT DOCUMENTS

| | | | |
|---|---|---|---|
| EP | 2624663 A1 | 8/2013 |
| WO | 2010000614 A1 | 1/2010 |

* cited by examiner

CONVERSION CIRCUIT BETWEEN FLUORESCENT BALLAST AND LED

CROSS-REFERENCE TO PRIOR APPLICATIONS

This application is the U.S. National Phase application under 35 U.S.C. § 371 of International Application No. PCT/EP2017/080142, filed on Nov. 23, 2017 which claims the benefit of European Patent Application No. 17159383.3, filed on Mar. 6, 2017 and Chinese Patent Application No. PCT/CN2016/107723, filed on Nov. 29, 2016. These applications are hereby incorporated by reference herein.

FIELD OF THE INVENTION

The invention relates to an LED lighting device, which includes a conversion circuit for converting first signals coming from a fluorescent ballast into second signals for feeding a lighting circuit via a rectifier circuit. The invention further relates to a lighting circuit and to a method.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electronic ballasts for fluorescent tube lamps.

There are now tubular LED ("TLED") lamps which can be used as a direct replacement for traditional fluorescent light tubes. In this way, the advantages of solid state lighting can be obtained without the expense of changing existing light fittings. Indeed, TLEDs that are compatible with fluorescent lamp ballasts are the most straightforward and lowest cost way of replacing fluorescent lighting by LED lighting. Both rewiring (removing the ballast, connecting a TLED directly to AC mains) and replacing the whole luminaire are considerably more cumbersome and expensive. Both electromagnetic (EM) and electronic high frequency (HF) ballasts are used in fluorescent lighting.

FIG. 1 shows a typical block diagram of a TLED that is compatible with a fluorescent ballast.

The ballast 10 comprises a half-bridge parallel resonant converter and it drives an electronic (high frequency) ballast compatible TLED 12.

The ballast 10 and high frequency compatible TLED 12 are connected via the connection pins 1 and 2 at one end of the TLED and via the connection pins 3 and 4 at the other end of the TLED. Note that different ballast types may instead make use of only one of the pins at each end to connect to the internal circuitry.

A high frequency compatible TLED 12 typically comprises all of the building blocks depicted in FIG. 1. These are a filament emulation unit 14, a pin safety and start-up circuit 16, a matching circuit 18, a rectifier 20, an LED driver 22, a smoothing capacitor 23 and the LED string 24. The LED string 24 extends between an internal ground 25 and a high voltage DC bus 26.

For most of these building blocks, the implementations shown in FIG. 1 are just examples and other implementations of their functions are possible and are also used. The LED driver shown in FIG. 1 is a shunt switch driver.

The details of the design of the half-bridge ballast 10 are not shown in FIG. 1. This type of ballast is also just an example and other implementations such as push-pull converters are also possible and in use.

The TLED 12 comprises four connection pins that are used to connect it to the ballast 10. Pin 1 and pin 2 are located at one end of the TLED and pin 3 and pin 4 are located at the other end of the TLED. The filament emulation unit comprises first circuitry connecting pin 1 and pin 2 to a pin 5 and pin 3 and pin 4 to a pin 6. Pin safety and start-up circuit 16, matching circuit 18, and rectifier 20 are connected to the ballast only via pin 5 and pin 6.

The matching circuits 18 used in HF ballast compatible TLEDs are used to reduce the output power and/or current of the ballast. Series connected elements in the matching circuits hamper current flowing to the LED string. Parallel connected elements in the matching circuits allow for current flowing from the HF ballast to the TLED that does not reach the LED string.

When the tubular LED lamp is dimmed down to no light output, several artifacts can still result in stable or unstable light output. The use of the high frequency ballast can inject charge in the LED string and can result in light output where no light is required. In particular, when the TLED is to be turned off, the output voltage is decreased below the forward voltage of LED string. However, there remains a large voltage drop to ground, and a leakage current is present resulting from charge injection.

It would therefore be desirable to avoid charge injection into the LED string, in particular so that the LEDs of the LED string do not light up when the TLED lamp is totally dimmed.

SUMMARY OF THE INVENTION

The invention is defined by the claims.

According to examples in accordance with an aspect of the invention, there is provided a tubular LED lamp, comprising:

an LED arrangement electrically connected between a voltage bus and an internal ground;

a driver circuit for driving the LED arrangement, wherein the driver circuit is adapted for connection to a high frequency ballast;

an electrically conductive screen; and an electrical connection between a node of the LED arrangement and the screen for preventing glow of the LED arrangement when the tubular LED lamp is in an off state.

By coupling the LED arrangement, for example the internal ground terminal of the LED arrangement, to a conducting screen, a low impedance path is provided for leakage currents which bypasses the LED string. In this way, a glow is prevented during a lowest brightness setting of the tubular LED lamp. The additional connection can be implemented easily without requiring significant additional components. The screen for example functions as a floating current sink.

Note that the internal ground is a non-isolated reference point—the name "internal ground" is not intended to suggest any connection to a real ground (earth) connection. The connection to the LED arrangement may be to any node within the LED string, for the example the string voltage (the voltage bus) or the internal ground or an intermediate location. All of these options for the node give a non-isolated voltage (meaning that the screen is at a voltage which corresponds to a voltage existing within the electrical circuit) and in particular at the voltage at a point along the LED string. As such, external human contact to the node and hence to the screen is to be avoided. The screen is neither held at a safe real earth potential nor is it a conductor which is isolated from the other voltages within the circuit.

The screen may comprise a heatsink.

The screen is this case not needed as an additional component but use is made of an existing heatsink. If the lamp does not need a heatsink, a dedicated screen may instead be provided. The heatsink is for example aluminum.

The electrical connection between the node and the screen may comprise a solder pad.

The solder pad is used to provide an electrical and mechanical connection between the screen (e.g. heatsink) and the node. Other connections may instead by used, such as soldered wires.

The electrical connection between the node and the screen may comprise a plurality of solder pads at multiple positions along the LED arrangement.

By providing multiple internal connections, a better electrical connection is provided to the screen (e.g. heatsink).

The driver circuit may be for providing a dimmable drive signal to the LED arrangement.

The lowest brightness setting (i.e. the deepest dimming) may in known designs result in a leakage current glow, which is avoided by the electrical connection to the screen.

The lamp may comprise an outer casing, wherein the screen is electrically isolated from the outer casing.

The screen is electrically floating and therefore should not be electrically contacted by a user.

The outer casing may be electrically insulating, and the screen is mounted to the outer casing using screws which are sunk in recesses of at least 5 mm depth. This avoids user contact with the mounting screws which mount the screen (e.g. heatsink).

The LED arrangement for example comprises an elongate printed circuit board on which a series string of LEDs is arranged. Nodes are defined at the ends of the string and at intermediate locations along the string.

The driver circuit may comprise:
a filament emulation circuit;
a pin safety and startup circuit;
a rectifier;
an output capacitor at the output of the rectifier; and
an LED driver.

The invention also provides a lighting installation comprising:
a fluorescent ballast; and
a lamp as defined above.

The fluorescent ballast of the lighting installation for example comprise a half-bridge resonant converter.

Examples in accordance with another aspect of the invention provide a method of preventing glow from a tubular LED which is driven by a fluorescent ballast, wherein the method is for preventing glow when the tubular LED is driven to an off state, the method comprising:
coupling a node of an LED arrangement of the tubular LED to an electrically conductive screen.

The coupling provides a low impedance path for leakage currents which bypasses the LED string, thus preventing glow. The node is for example an internal ground.

The screen for example comprises a heatsink and it is preferably isolated from an outer housing of the lamp.

BRIEF DESCRIPTION OF THE DRAWINGS

Examples of the invention will now be described with reference to the accompanying drawings, in which.

DETAILED DESCRIPTION OF EMBODIMENTS

The invention provides a tubular LED lamp designed for connection to a high frequency ballast. An electrically conductive screen is provided with an electrical connection between an internal node such as an internal ground and the screen. This provides a low impedance path for leakage currents which bypasses the LED string and thus prevents glow.

Figure 1:
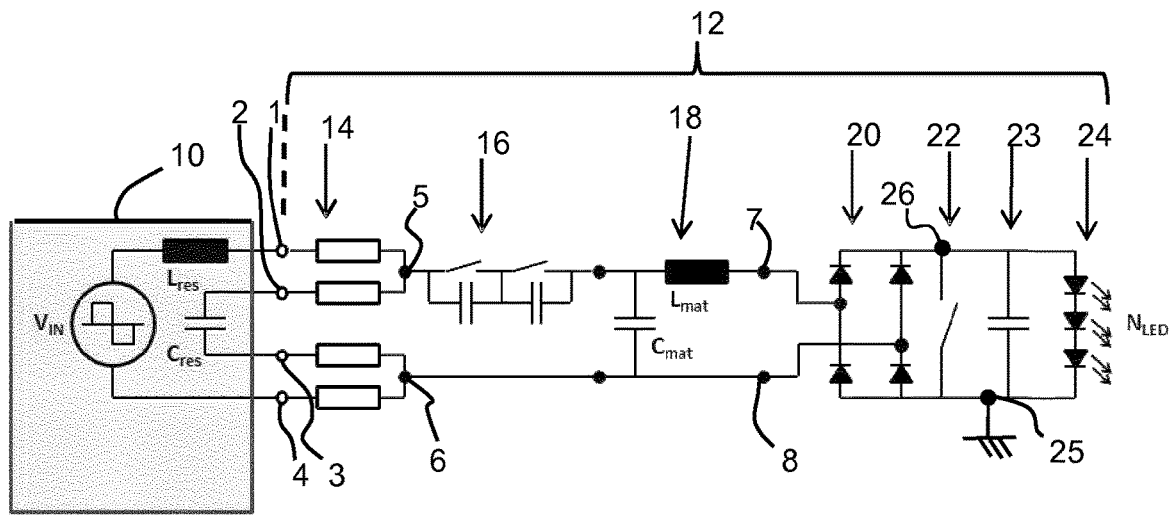
FIG. 1 shows a typical block diagram of a TLED that is compatible with a fluorescent ballast.
Figure 2:
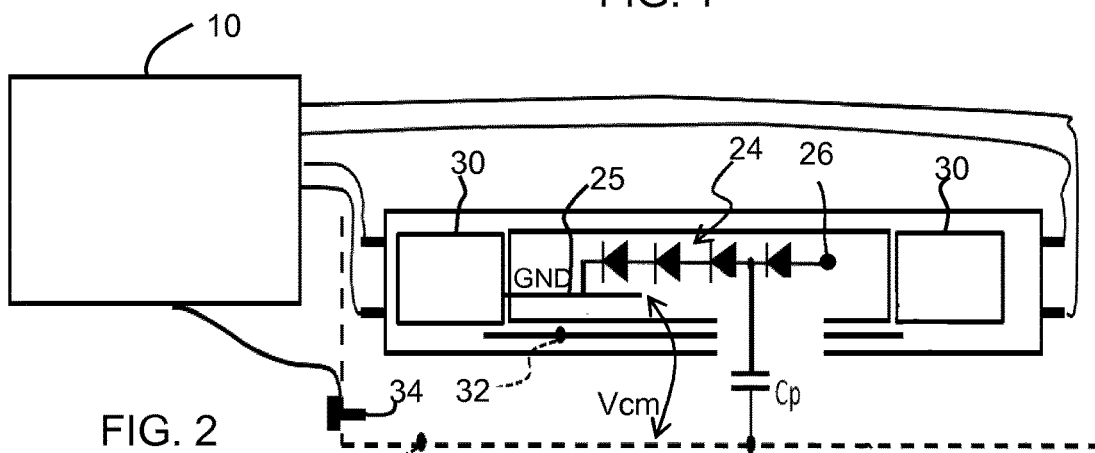
FIG. 2 shows in a simplified block diagram how parasitic capacitances result in a leakage current which causes a glow even when the TLED is fully dimmed.

FIG. 2 shows in a simplified block diagram how parasitic capacitances in the circuit of FIG. 1 result in a leakage current which causes a glow even when the TLED is fully dimmed.

The same reference numbers are used as in FIG. 1. The internal driver circuit components (such as the filament emulation unit 14, the pin safety and start-up circuit 16, the matching circuit 18, the rectifier 20, the LED driver 22 and the smoothing capacitor 23 of FIG. 1) are simply represented as circuit blocks 30 at each end of the tubular LED lamp. The LED string 24 again extends between an internal ground 25 and a high voltage DC bus 26. The LED string comprises a series of nodes, including the internal ground at one end and the DC string voltage at the other end, and the interconnections between the LEDs in the string.

The tubular LED is dimmable. A full (i.e. maximum depth) dimming setting is for example a standby mode and corresponds to an off state of the tubular LED.

To implement a dimming functionality, a tubular LED lamp (without internal dimming control) may be connected to a dimmable ballast, and the driver circuit thus delivers a dimmable drive signal to the LED string. The glow problem explained above may be avoided because such a ballast will typically switch off the output when the system is in standby mode.

The invention is of particular interest for implementing a dimmable LED lamp using a non-dimmable ballast. In this case, the tubular LED circuit blocks include wireless dimming functionality. For this purpose, they include a wireless receiver (or transceiver) circuit for receiving dimming commands from a wireless remote control device. The non-dimmable ballast remains turned on even when the tubular LED is dimmed to its maximum dimming setting. The dimming functionality is in this way implemented locally within the lamp itself, and the lamp itself has a dimming unit as part of its driver circuit.

In this case, there is likely to be a glow issue because the ballast does not switch off the high frequency output when in the standby mode; instead it keeps generating the high frequency voltage. A leakage current via the LED string to the environment then causes the glow issue.

The invention relates to overcoming this leakage current problem.

The invention may however also find application for use with dimmable ballasts. One possible use case is that an installer can set the existing dimmable ballast system to operate at 100% all the time, thus no longer using the existing dimming functionality. The lamp control is then taken over by the wireless interface of the dimmable lamp. In this case, the existing dimmable ballast is just used as a non-dimmable ballast. The same glow effect then arises.

Furthermore, when providing very deep dimming, a glow issue may still arise even with a dimmable ballast, meaning that lamps may have different brightness levels at a very deep dimming settings.

Furthermore, if an injected current has a low frequency modulation, it can cause flicker even at relatively low injected currents. This issue arises with dimmable or non-dimmable ballasts.

The dimming functionality is primarily used to enable brightness control, in known manner. In addition to providing general light output control, the dimming capability may also be used to set dynamic lighting features, such as a soft shut down, by which the light output is changed gradually over time in response to requested changes in dimming setting (or full on or full off commands).

The ballast 10 generates a high voltage at a high frequency, for driving previous fluorescent lamps. The lamp has a heatsink 32, typically made of aluminum. The heatsink 32 carries the LED circuit board or boards.

The outer casing of the lamp may be electrically insulating or it may be a metal outer casing. If a metal outer case is used, it may be connected to a protective earth terminal 34 for safety reasons or, more preferably, it is insulated from the live parts inside the lamp and then is electrically floating. Even when plastic outer casings are used, there will be internal metal planes to ensure proper high frequency fluorescent lamp operation and EMI requirements.

The LED driver circuit ground creates the internal ground 25 and it has a common mode voltage to the protective earth 34 for the example of a metal outer casing. The common mode voltage is generally the potential between the LED string voltages (i.e. the ballast output wires) and earth, for example between the internal ground and earth. There are other components between, such as a plastic tube housing, and this will impact the parasitic capacitance Cp. As long as there is a parasitic capacitance and a common voltage is present, there will be a leakage current to earth.

The high common mode voltage of several hundred volts at the ballast frequency (e.g. 50 kHz) in combination with the parasitic capacitance Cp between the LED string and the protective earth 34 injects current in the LED string and results in glow.

Figure 3:
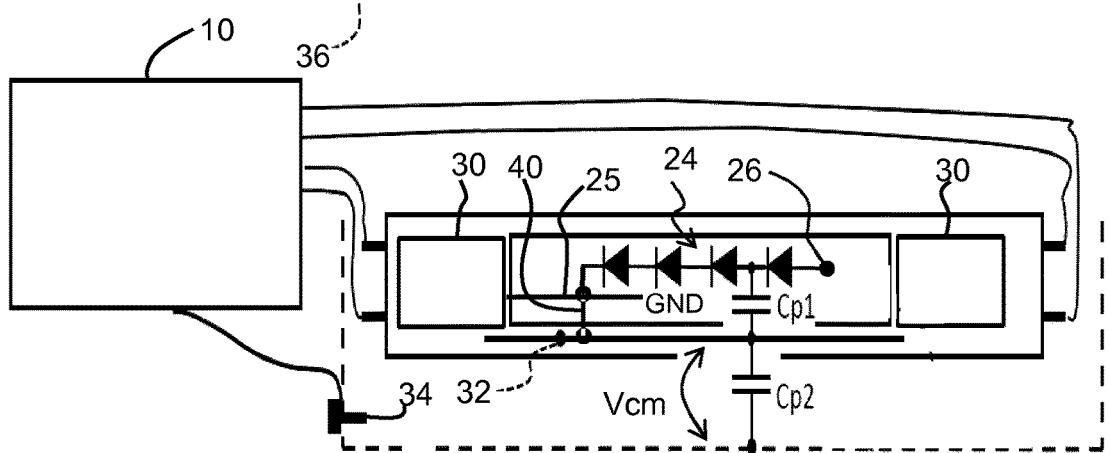
FIG. 3 shows in a simplified block diagram how the problem explained with reference to FIG. 2 is addressed.

FIG. 3 shows in a simplified block diagram how the problem explained with reference to FIG. 2 is addressed.

The LED arrangement 24 is again electrically connected between a voltage bus 26 and an internal ground 25 (or another voltage bus). The driver circuit 30 drives the LED arrangement, and is connected to the high frequency ballast 10.

The heatsink 32 forms an electrically conductive screen. Some designs may not require a heatsink, in which case a dedicated electrically conductive screen may be provided.

The invention makes use of an electrical connection 40 between the LED string and the screen 32. The connection is for example from the internal ground 25 to the screen 32, but it may be from the string voltage level to the screen or from an internal node along the LED string to the screen.

The internal ground is the cathode connection of the LED arrangement 24 and the string voltage level is the anode connection of the LED arrangement.

The connection has a low impedance compared to the parasitic capacitance impedance to enable a reduction in charge injection.

The parasitic capacitance Cp is in this way divided into two parts. A first part Cp1 exists between the LED string and the conductive screen 32. A second part Cp2 exists between the conductive screen 32 and the protective earth 34.

The connection of the screen 32 to the node, for example to the internal ground, means the common mode voltage Vcm is only across the second parasitic capacitor part Cp2. As a result, no currents are injected into the LED string, resulting in no LED glow when the LED is set to its lowest brightness setting.

In particular, a low impedance path is provided for leakage currents which bypasses the LED string. The screen 32 functions as a floating current sink.

Figure 4:
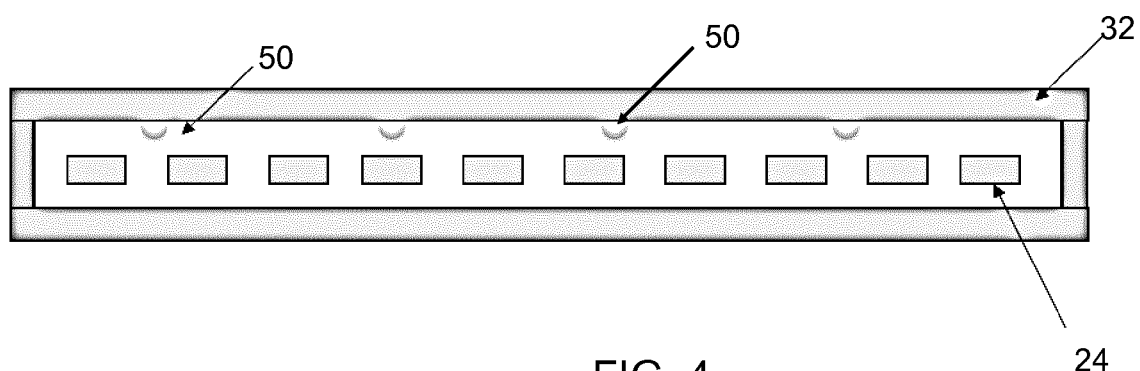
FIG. 4 shows how connections can be made between the LED string and the heatsink.

FIG. 4 shows the heatsink 32 surrounding the LED printed circuit board, on which the LEDs 24 are mounted. The electrical connection between the node (e.g. the internal ground) and the screen comprises a solder pad or a series of solder pads 50 between pads, e.g. internal ground pads, of the printed circuit board and the heatsink (or other screen). The solder pads provide an electrical connection between the screen and the node, e.g. the internal ground. By distributing the connections along the length of the LED arrangement a uniform charge distribution in the screen (or heatsink) is enabled. Other connections may instead be used, such as soldered wires. A solder connection additionally provides mechanical connection.

The LED board may instead be connected to the heatsink via a friction force which also provides the desired electrical connections, so that soldering is not essential.

The screen (or heatsink) now functions as an electrically floating charge store. It therefore should not be electrically contacted by a user. In particular, the design needs to satisfy safety contact tests.

Figure 5:
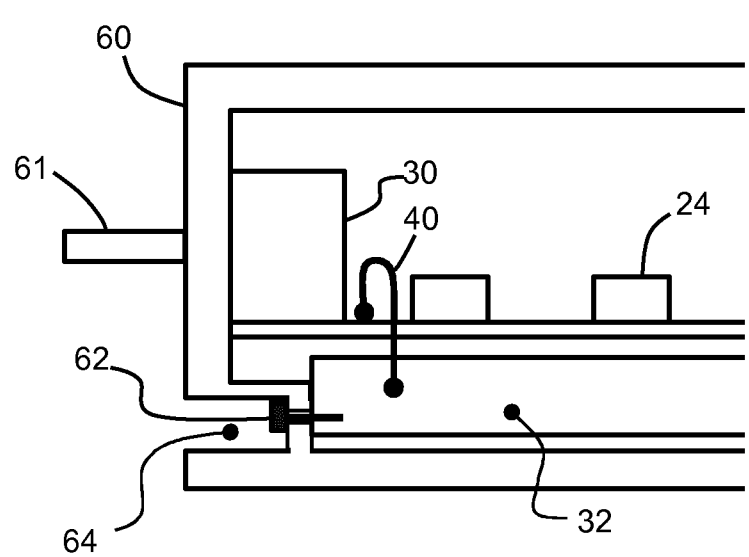
FIG. 5 shows a casing design to prevent the heatsink being touched by a user.

FIG. 5 shows how this may be achieved for a design with an electrically insulating outer cover 60, from which the connection pins 61 extend.

The screen 32 is mounted to the outer casing using screws 62 which are sunk in recesses 64 of at least 5 mm depth. This avoids user contact with the mounting screws which mount the screen (e.g. heatsink).

The invention thus provides a method of preventing glow from a tubular LED which is driven by a fluorescent ballast which is based on coupling an internal node of an LED arrangement of the tubular LED to a screen.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A tubular LED lamp, comprising:
an LED arrangement electrically connected between a voltage bus and an internal ground;

a driver circuit for driving the LED arrangement, wherein the driver circuit is adapted for connection to a high frequency ballast;

an electrically conductive screen enclosed within an electrically insulating outer cover; and an electrical connection between a node of the LED arrangement and the screen for preventing glow of the LED arrangement when the tubular LED lamp is in an off state.

2. A lamp as claimed in claim 1, wherein the electrical connection is between the internal ground and the screen.

3. A lamp as claimed in claim 1, wherein the screen comprises a heatsink.

4. A lamp as claimed in claim 1, wherein the electrical connection between the node and the screen comprises a solder pad.

5. A lamp as claimed in claim 4, wherein the electrical connection between the node and the screen comprises a plurality of solder pads at multiple positions along the LED arrangement.

6. A lamp as claimed in claim 1, wherein the driver circuit comprises a dimming unit for providing a dimmable drive signal to the LED arrangement; and wherein the lamp further comprises a wireless receiver for receiving a command to implement said dimmable drive signal within the lamp itself.

7. A lamp as claimed in claim 1, comprising an outer casing, wherein the screen is electrically isolated from the outer casing.

8. A lamp as claimed in claim 7, wherein the outer casing is electrically insulating, and wherein the screen is mounted to the outer casing using screws which are sunk in recesses of at least 5 mm depth.

9. A lamp as claimed in claim 1, wherein the LED arrangement comprises an elongate printed circuit board on which a series string of LEDs is arranged.

10. A lamp as claimed in claim 1, wherein the driver circuit comprises:
a filament emulation circuit;
a pin safety and startup circuit;
a rectifier;
an output capacitor at the output of the rectifier; and
an LED driver.

11. A lighting installation comprising:
a fluorescent ballast; and
a lamp as claimed in claim 1.

12. A lighting installation as claimed in claim 11, wherein the fluorescent ballast comprises a half-bridge resonant converter.

13. A method of preventing glow from a tubular LED which is driven by a fluorescent ballast, wherein the method is for preventing glow when the tubular LED is driven to an off state, the method comprising:
coupling a node of an LED arrangement of the tubular LED to an electrically conductive screen; and,
electrically isolating the screen from an outer housing of the lamp.

14. A method as claimed in claim 13, comprising forming the coupling by providing an electrical connection between an internal ground and the screen.

* * * * *